(12) United States Patent
Rathee et al.

(10) Patent No.: US 12,704,522 B2
(45) Date of Patent: Aug. 11, 2026

(54) THREE-DIMENSIONAL SHOCK DETECTION USING KNOCK SENSOR AND TUNING FORK

(71) Applicant: Vitesco Technologies USA, LLC, Auburn Hills, MI (US)

(72) Inventors: Mandeep Rathee, Troy, MI (US); Thierry Morales, Garidech (FR)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 28 days.

(21) Appl. No.: 18/665,158

(22) Filed: May 15, 2024

(65) Prior Publication Data

US 2025/0244355 A1 Jul. 31, 2025

Related U.S. Application Data

(60) Provisional application No. 63/603,259, filed on Nov. 28, 2023.

(51) Int. Cl.

| | |
|---|---|
| ***G01P 15/097*** | (2006.01) |
| ***G01P 15/08*** | (2006.01) |
| ***G01P 15/125*** | (2006.01) |
| ***G01P 15/18*** | (2013.01) |
| ***H01M 10/42*** | (2006.01) |
| ***H01M 10/48*** | (2006.01) |

(52) U.S. Cl.

CPC .......... *G01P 15/097* (2013.01); *G01P 15/125* (2013.01); *G01P 15/18* (2013.01); *H01M 10/425* (2013.01); *H01M 10/48* (2013.01); *G01P 2015/0862* (2013.01)

(58) Field of Classification Search

CPC ........ G01H 17/00; G01H 11/06; G01H 13/00; G01H 1/06; G01H 3/04; G01P 15/097; G01P 15/125; G01P 15/18; G01P 2015/0862; G01P 15/0975; B60L 3/0046; B60L 3/12; B60L 50/64; H01M 10/425; H01M 10/48; H01M 2010/4278; H01M 2220/20; H01M 50/579; G01N 29/045; G01N 29/12; G01N 29/022; G01N 29/036; G01N 2009/006; G01N 29/42; G01N 2291/0427; G10K 11/04; G01M 7/00

USPC ... 73/514.29, 570, 662, 778, 114.07, 862.41, 73/862.59, 504.15–504.16, 579, 630, 73/12.01–12.14

See application file for complete search history.

(56) References Cited

U.S. PATENT DOCUMENTS

2011/0162451 A1* 7/2011 Petelenz ................ G01P 1/127 73/514.01

* cited by examiner

*Primary Examiner* — John E Breene
*Assistant Examiner* — Truong D Phan

(57) ABSTRACT

A shock detection system for the battery pack of an electric vehicle, where the shock detection system uses at least one passive sensor, such as a knock sensor, for vibration detection. This sensor has large design freedom on the battery pack, either inside or outside, and is connected to the system for data treatment and data analysis. In addition to the knock sensor, the shock detection system also includes tuning forks located on the battery pack, where each tuning fork has a specific resonance frequency. During operation, when there is a shock or impact to the battery pack, each tuning fork resonates at a specific frequency, and the passive knock sensor detects these frequencies. The knock sensor then sends these frequency spectrums to the ECU of the electric vehicle, the ECU then determines the amplitude of the different frequencies and calculates the intensity and position of the impact using triangulation.

14 Claims, 2 Drawing Sheets

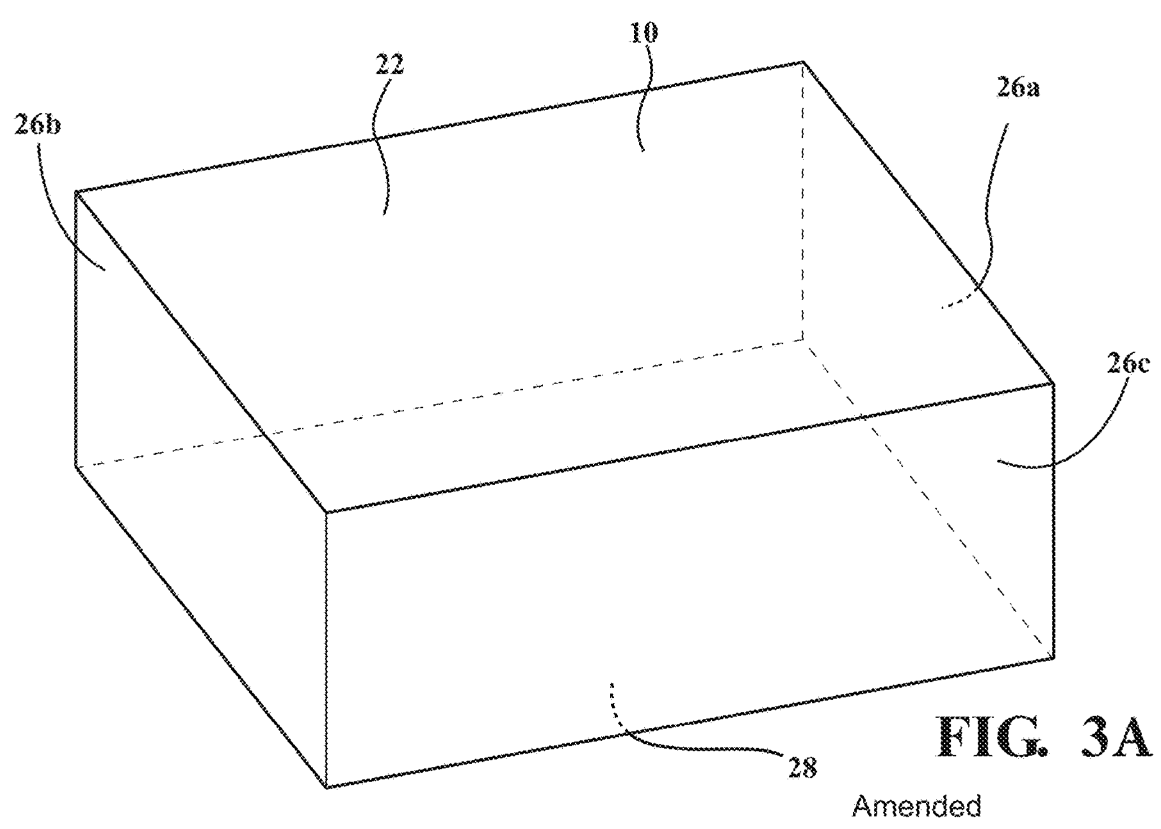
FIG. 3A
Amended

THREE-DIMENSIONAL SHOCK DETECTION USING KNOCK SENSOR AND TUNING FORK

CROSS-REFERENCE TO RELATED APPLICATIONS

This application claims the benefit of provisional application 63/603,259, filed Nov. 28, 2023. The disclosure of the above application is incorporated herein by reference.

FIELD OF THE INVENTION

The invention relates generally to a shock detection system for detecting impact to a battery pack of an electric vehicle or hybrid electric vehicle.

BACKGROUND OF THE INVENTION

There are various design features implemented in electric vehicles which are used to provide an alert when the battery pack of the electric vehicle is malfunctioning. Some designs include pressure and/or temperature sensors to detect battery runaway. However, many current designs do not include the ability to detect or protect against impact/shock. Some battery packs are designed to resist shock, but any type of battery damage may lead to fire or malfunctioning of the vehicle.

Also, current sensor designs for battery packs are incapable of detecting deformation, or the severity of the damage and location. Damage may be anywhere on the battery pack and is not always detectable.

Many current designs also have limitations with regard to sealing flexibility, which results in limitations for flow path design and efficiency for a battery cooling system.

Accordingly, there exists a need for the ability to detect impact or shock to a battery pack of an electric vehicle or hybrid electric vehicle.

SUMMARY OF THE INVENTION

In an embodiment, the present invention is a shock detection system having a shock sensor for the battery pack of an electric vehicle, where the shock detection system uses at least one passive sensor, such as a knock sensor, for vibration detection. This sensor has large design freedom on the battery pack, either inside or outside, and is connected for example to the electronic control unit (ECU) of the vehicle for data treatment and data analysis. In addition to the knock sensor, the shock detection system of the present invention also includes multiple tuning forks located on the battery pack, where each tuning fork has a specific resonance frequency.

During operation, when there is a shock or impact to the battery pack, each tuning fork resonates at a specific frequency, and the passive knock sensor detects these frequencies in addition to the initial shock or impact. The knock sensor then sends these frequency spectrums to the ECU of the electric vehicle, the ECU then determines the amplitude of the different frequencies and calculates the intensity of the impact and position using triangulation. In an embodiment, the ECU is programmed to evaluate the severity of the impact/shock and inform the driver.

In an embodiment, the shock detection system of the present invention includes at least one sensor for triangular precise evaluation of the impact. The shock detection system of the present invention is robust, requires no maintenance, and has low power consumption.

In an embodiment, the shock detection system of the present invention is able to detect when the vehicle is idle or driving. Also, the shock detection system of the present invention provides alerts as to when the battery pack may be damaged, which could be dangerous to the passengers of the vehicle.

The alert provided by the shock detection system of the present invention may provide improved reaction time such that any fire could be suppressed sooner and mitigate fire damage to surrounding buildings or nearby vehicles. The driver/passengers may also be warned such that the vehicle may be exited prior to exposure to danger from the fire.

The present invention is not limited for use with a knock sensor, but may be used with other types of sensors, such as a MEMS sensor, a capacitive sensor, or other type of sensor.

In an embodiment, the present invention is a shock detection system, including a sensor assembly having at least one sensor mounted to a battery pack, and a control unit in electrical communication with the sensor. A plurality of resonators is mounted to the battery pack. One or more of the plurality of resonators generates one or more of a plurality of signals when the battery pack is subjected to an impact, and one or more of the plurality of signals is transferred to the sensor, and the signals received by the sensor are communicated to the control unit, such that the control unit transfers one or more of the signals to an ECU of a vehicle.

In an embodiment, each of the resonators is a tuning fork. In an embodiment, two of the plurality of resonators are located on opposite sides of the battery pack. The position of each tuning fork facilitates the triangulation of the position of the impact.

In an embodiment, the sensor and each of the resonators are located on a bottom surface of the battery pack. However, the present invention is not limited to the sensor and each of the resonators being exclusively located on the bottom surface of the battery pack. The sensor and/or one or more of the resonators may also be located on a combination of the bottom surface and one or more of the side surfaces or the top surface of the battery pack.

In an embodiment, the sensor is a MEMS sensor. In another embodiment, the sensor is a capacitive sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a diagram of a battery pack having another alternate embodiment of a shock detection system, according to embodiments of the present invention;

DETAILED DESCRIPTION OF THE PREFERRED EMBODIMENTS

The following description of the preferred embodiment(s) is merely exemplary in nature and is in no way intended to limit the invention, its application, or uses.

Figures 1, 2:
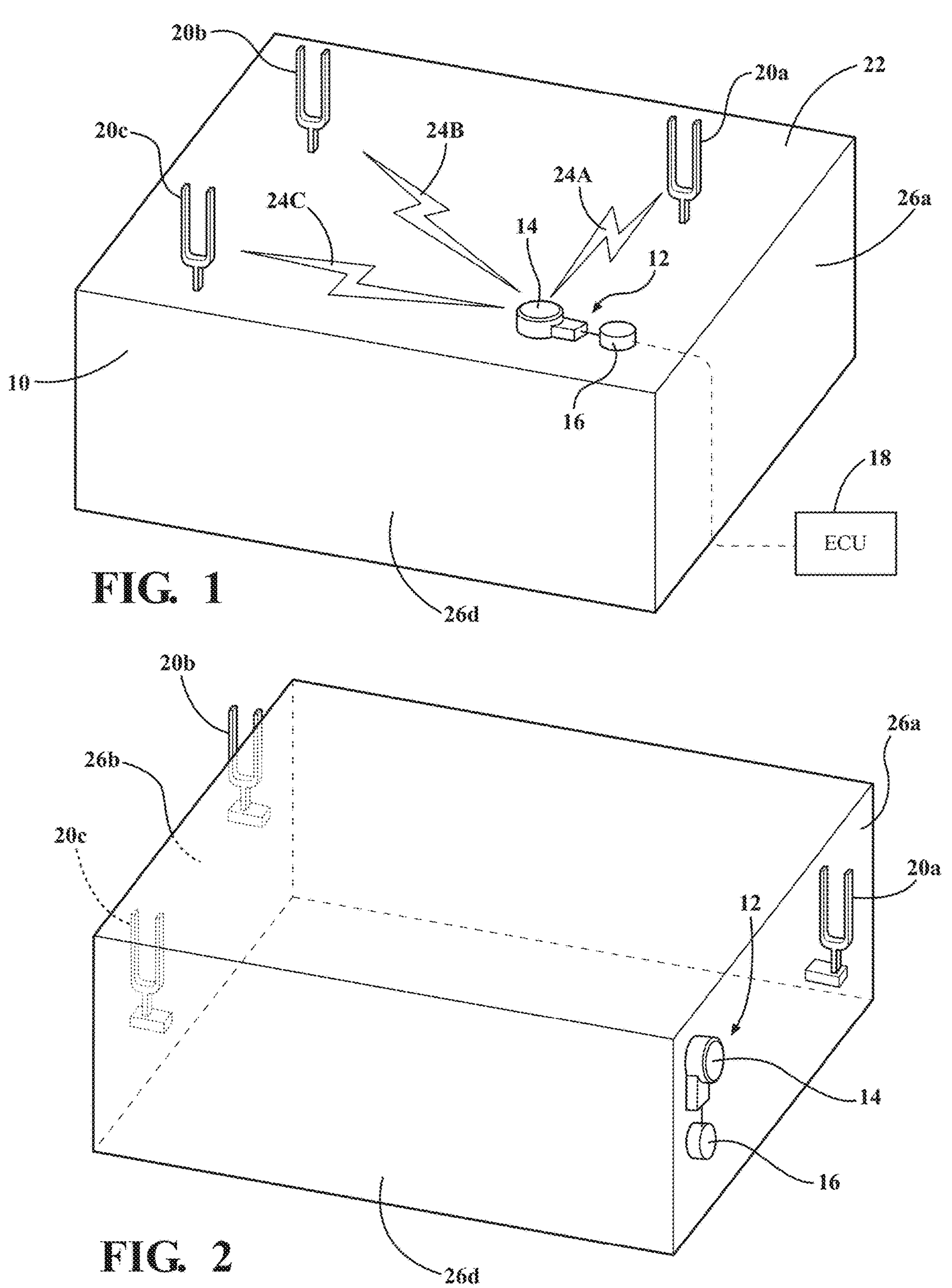
FIG. 1 is a diagram of a battery pack having a shock detection system, according to embodiments of the present invention.
FIG. 2 is a diagram of a battery pack having an alternate embodiment of a shock detection system, according to embodiments of the present invention.

A battery pack for an electric vehicle having a shock detection system according to the present invention is shown in the FIG. 1 at 10. Mounted to the battery pack 10 is at least one sensor assembly, shown generally at 12. In this embodiment, the sensor assembly 12 includes a knock sensor 14 and a control unit 16. The knock sensor 14 and the control unit 16 are mounted on a first surface, or outer top surface 22 of the battery pack 10. The control unit 16 is in electrical communication with an electronic control unit (ECU) 18 of the vehicle.

Also mounted to the battery pack 10 is a plurality of resonators 20*a*,20*b*,20*c*. In the embodiment shown, each resonator 20*a*,20*b*,20*c* is a tuning fork, but it is within the scope of the invention that other types of resonators may be used. Each resonator 20*a*,20*b*,20*c* is located on a different area of the outer top surface 22 of the battery pack 10. The resonators 20*a*,20*b*,20*c* are spaced at a distance from one another and from the sensor assembly 12, as shown in FIG. 1. Each resonator 20*a*,20*b*,20*c* generates a specific signal 24*a*,24*b*,24*c*, and the knock sensor 14 receives one or more of the signals 24*a*,24*b*,24*c*.

During operation, if the battery pack 10 is subject to an impact, one or more of the resonators 20*a*,20*b*,20*c* generates the corresponding signals 24*a*,24*b*,24*c*. The strength of the signals 24*a*,24*b*,24*c* may vary, depending upon the magnitude of the impact on the battery pack 10. The signals 24*a*,24*b*,24*c* are received by the knock sensor 14, and the control unit 16 then sends the signals 24*a*,24*b*,24*c* to the ECU 18, where the ECU 18 interprets the signals 24*a*,24*b*, 24*c* and calculates the magnitude of the impact. Because three resonators 20*a*,20*b*,20*c* are used, the ECU 18 is able to detect and calculate the magnitude and triangulate the location of the impact.

In some embodiments, the resonators 20*a*,20*b*,20*c* may be positioned on outer surfaces of the battery pack 10 which are on opposite sides of the battery pack 10 relative to one another, allowing for vibration detection within a three-dimensional volume.

In an example of an alternate embodiment, shown in FIG. 2, any two of the plurality of resonators 20*a*,20*b*,20*c*, or any combination of the knock sensor 14 and one of the plurality of resonators 20*a*,20*b*,20*c*, may be located on opposite sides of the battery pack 10. More specifically, as shown in FIG. 2, the sensor assembly 12 and the first resonator 20*a* are located on a first side surface 26*a*, and the second resonator 20*b* and third resonator 20*c* are located on a second side surface 26*b*, where the side surfaces 26*a*,26*b* are on opposite sides of the battery pack 10 relative to one another.

In another alternate embodiment, the sensor assembly 12 and one or more of the resonators 20*a*,20*b*,20*c* may be located on opposite sides of the battery pack 10.

Figure 3B:
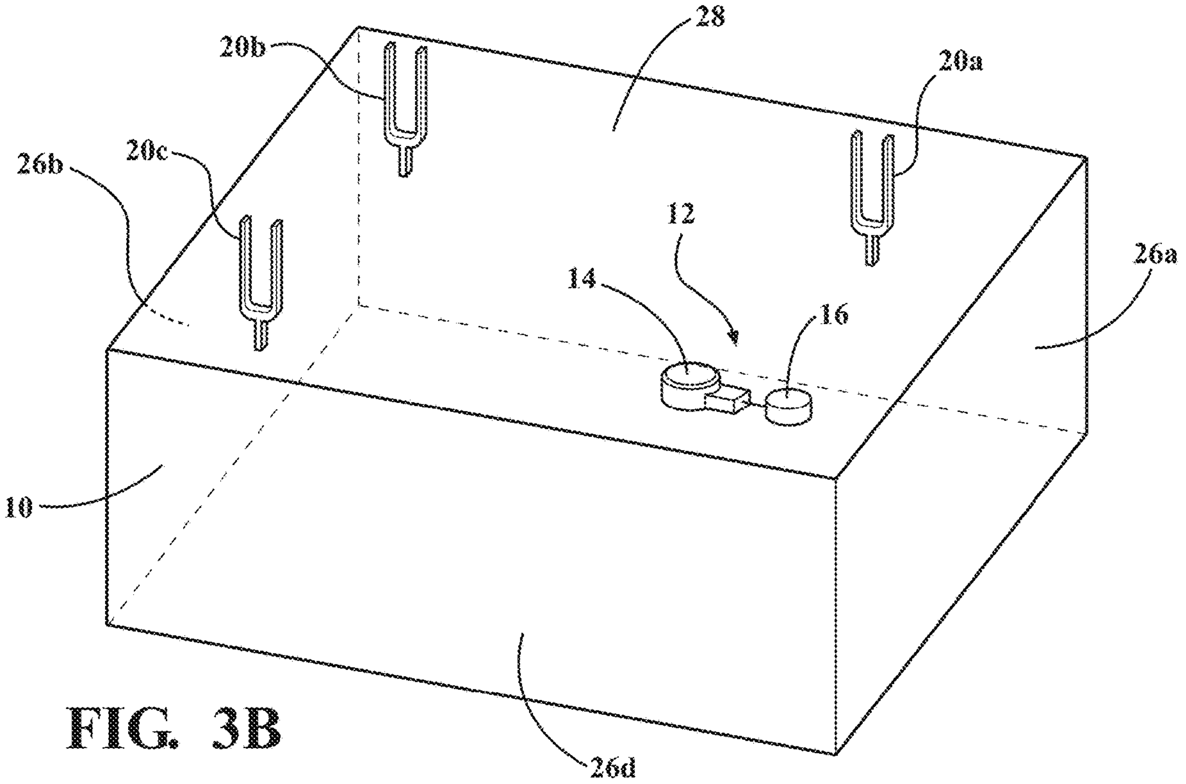
FIG. 3B a diagram of a battery pack having the embodiment of a shock detection system shown in FIG. 3A but rotated such that the bottom surface is facing upward, according to embodiments of the present invention.

Referring to FIGS. 3A and 3B, another embodiment of the present invention is shown, with like numbers referring to like elements. In this embodiment, the knock sensor 14 and the resonators 20*a*,20*b*,20*c* are located on a bottom surface 28 of the battery pack 10. In other embodiments, it is within the scope of the invention that the sensor assembly 12 and/or one or more of the resonators 20*a*,20*b*,20*c* may also be located on a combination of the bottom surface 28 and one or more of the side surfaces 26*a*,26*b*,26*c*,26*d* or the outer top surface 22 of the battery pack 10.

The knock sensor 14 and one or more of the resonators 20*a*,20*b*,20*c* may be located on the various outer surfaces of the battery pack 10 to facilitate the detection of an impact on the battery pack 10, as well as meeting various packaging requirements.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:

a shock detection system, comprising:

at least one sensor mounted to a battery pack; and at least one resonator mounted to the battery pack;

wherein the at least one resonator generates a signal when the battery pack is subjected to an impact, and the signal is transferred to the at least one sensor.

2. The apparatus of claim 1, the at least one resonator further comprising:

a plurality of resonators mounted to the battery pack;

wherein one or more of the plurality of resonators generates one or more of a plurality of signals when the battery pack is subjected to an impact, and one or more of a plurality of signals is transferred to the at least one sensor.

3. The apparatus of claim 2, each of the plurality of resonators further comprising a tuning fork.

4. The apparatus of claim 3, wherein a position of each tuning fork facilitates a triangulation of the position of the impact.

5. The apparatus of claim 2, wherein two of the plurality of resonators are located on opposite sides of the battery pack.

6. The apparatus of claim 2, wherein the at least one sensor and each of the plurality of resonators are located on a bottom surface of the battery pack.

7. The apparatus of claim 1, further comprising:

a control unit in communication with the at least one sensor;

wherein the signal received by the at least one sensor is communicated to the control unit, such that the control unit transfers the signal to the ECU of a vehicle.

8. The apparatus of claim 1, the at least one sensor further comprising one selected from the group consisting of a MEMS sensor and a capacitive sensor.

9. A shock detection system, including:

a sensor assembly, further comprising:

at least one sensor mounted to a battery pack;

a control unit in electrical communication with the at least one sensor; and a plurality of resonators mounted to the battery pack;

wherein one or more of the plurality of resonators generates one or more of a plurality of signals when the battery pack is subjected to an impact, and one or more of a plurality of signals is transferred to the at least one sensor, and the one or more of the plurality of signals received by the at least one sensor is communicated to the control unit, such that the control unit transfers the one or more of the plurality of signals to an ECU of a vehicle.

10. The shock detection system of claim 9, each of the plurality of resonators further comprising a tuning fork.

11. The shock detection system of claim 10, wherein a position of each tuning fork facilitates a triangulation of the position of the impact.

12. The shock detection system of claim 9, wherein two of the plurality of resonators are located on opposite sides of the battery pack.

13. The shock detection system of claim 9, wherein the at least one sensor and each of the plurality of resonators are located on a bottom surface of the battery pack.

14. The shock detection system of claim 9, the at least one sensor further comprising one selected from the group consisting of a MEMS sensor and a capacitive sensor.

* * * * *